(12) United States Patent
Monestier et al.

(10) Patent No.: US 10,969,077 B2
(45) Date of Patent: Apr. 6, 2021

(54) OPTICAL ARRANGEMENT WITH IMPROVED STABILITY

(71) Applicant: LUMILEDS HOLDING B.V., Schiphol (NL)

(72) Inventors: Florent Monestier, Kerkrade (NL); Benno Spinger, Aachen (DE)

(73) Assignee: Lumileds LLC, San Jose, CA (US)

( * ) Notice: Subject to any disclaimer, the term of this patent is extended or adjusted under 35 U.S.C. 154(b) by 0 days.

(21) Appl. No.: 16/678,303

(22) Filed: Nov. 8, 2019

(65) Prior Publication Data
US 2020/0149701 A1 May 14, 2020

(30) Foreign Application Priority Data

Nov. 8, 2018 (EP) ..................................... 18205198

(51) Int. Cl.
| | |
|---|---|
| *F21S 41/32* | (2018.01) |
| *F21S 41/25* | (2018.01) |
| *F21S 41/365* | (2018.01) |
| *F21S 41/153* | (2018.01) |
| *F21S 41/39* | (2018.01) |
| *G02B 27/30* | (2006.01) |
| *F21Y 105/16* | (2016.01) |
| *F21Y 115/10* | (2016.01) |

(Continued)

(52) U.S. Cl.
CPC ........... *F21S 41/322* (2018.01); *F21S 41/153* (2018.01); *F21S 41/25* (2018.01); *F21S 41/365* (2018.01); *F21S 41/39* (2018.01); *G02B 27/30* (2013.01); *F21S 41/285* (2018.01); *F21S 41/29* (2018.01); *F21Y 2105/16* (2016.08); *F21Y 2115/10* (2016.08)

(58) Field of Classification Search
CPC ........ F21S 41/141; F21S 41/153; F21S 41/25; F21S 41/285; F21S 41/29; F21S 41/322; F21S 41/365; F21S 41/39; G02B 19/0066; G02B 19/0028
See application file for complete search history.

(56) References Cited

U.S. PATENT DOCUMENTS

| | | | |
|---|---|---|---|
| 6,402,347 B1 * | 6/2002 | Maas | ...................... F21V 5/007 315/312 |
| 2007/0069230 A1 | 3/2007 | Yu | |

(Continued)

FOREIGN PATENT DOCUMENTS

| | | |
|---|---|---|
| WO | 2017/157706 A1 | 9/2017 |
| WO | 2018/065278 A1 | 4/2018 |

*Primary Examiner* — Zheng Song
(74) *Attorney, Agent, or Firm* — Volpe Koenig

(57) ABSTRACT

The invention relates to an optical arrangement including LED lighting elements arranged on a support surface. An optical axis X extends from the support surface. A first collimator unit includes at least one support element and first collimator elements. The support element is supported on the support surface between at least two of the LED lighting elements. The first collimator elements are arranged in front of the LED lighting elements in the direction of the optical axis X to collimate light emitted from the LED lighting elements. A second collimator unit is arranged in front of the first collimator unit in the direction of the optical axis X. The second collimator unit includes second collimator elements arranged in front of the first collimator elements to collimate light emitted therefrom.

19 Claims, 5 Drawing Sheets

(51) Int. Cl.
    *F21S 41/29*        (2018.01)
    *F21S 41/20*        (2018.01)

(56)            References Cited

U.S. PATENT DOCUMENTS

| | | | |
|---|---|---|---|
| 2009/0161360 A1* | 6/2009 | Li | F21V 5/048 |
| | | | 362/235 |
| 2010/0183338 A1 | 7/2010 | Sowa et al. | |
| 2011/0032707 A1* | 2/2011 | Takashige | F21V 17/02 |
| | | | 362/277 |
| 2013/0301264 A1* | 11/2013 | Van Gompel | F21V 19/003 |
| | | | 362/236 |
| 2014/0133143 A1* | 5/2014 | Ebner | F21V 7/0091 |
| | | | 362/231 |
| 2015/0204491 A1* | 7/2015 | Yuan | F21V 5/045 |
| | | | 362/311.02 |
| 2015/0323147 A1* | 11/2015 | Kanayama | F21V 11/16 |
| | | | 362/487 |
| 2016/0146416 A1* | 5/2016 | Taudt | G02B 19/0028 |
| | | | 362/511 |
| 2016/0252226 A1* | 9/2016 | Shih | F21S 45/47 |
| | | | 362/511 |
| 2017/0122528 A1* | 5/2017 | Kadoriku | B60Q 1/12 |
| 2017/0146798 A1* | 5/2017 | Nambara | F21V 5/008 |
| 2017/0219186 A1* | 8/2017 | Enno | F21V 13/02 |
| 2018/0017235 A1* | 1/2018 | Casper | F21V 9/38 |
| 2018/0187851 A1* | 7/2018 | Hossfeld | F21S 41/26 |
| 2018/0187853 A1* | 7/2018 | Schiccheri | F21S 41/285 |
| 2018/0320852 A1* | 11/2018 | Mandl | F21S 41/322 |
| 2019/0265469 A1* | 8/2019 | Adeyshvili | G02B 3/0037 |

* cited by examiner

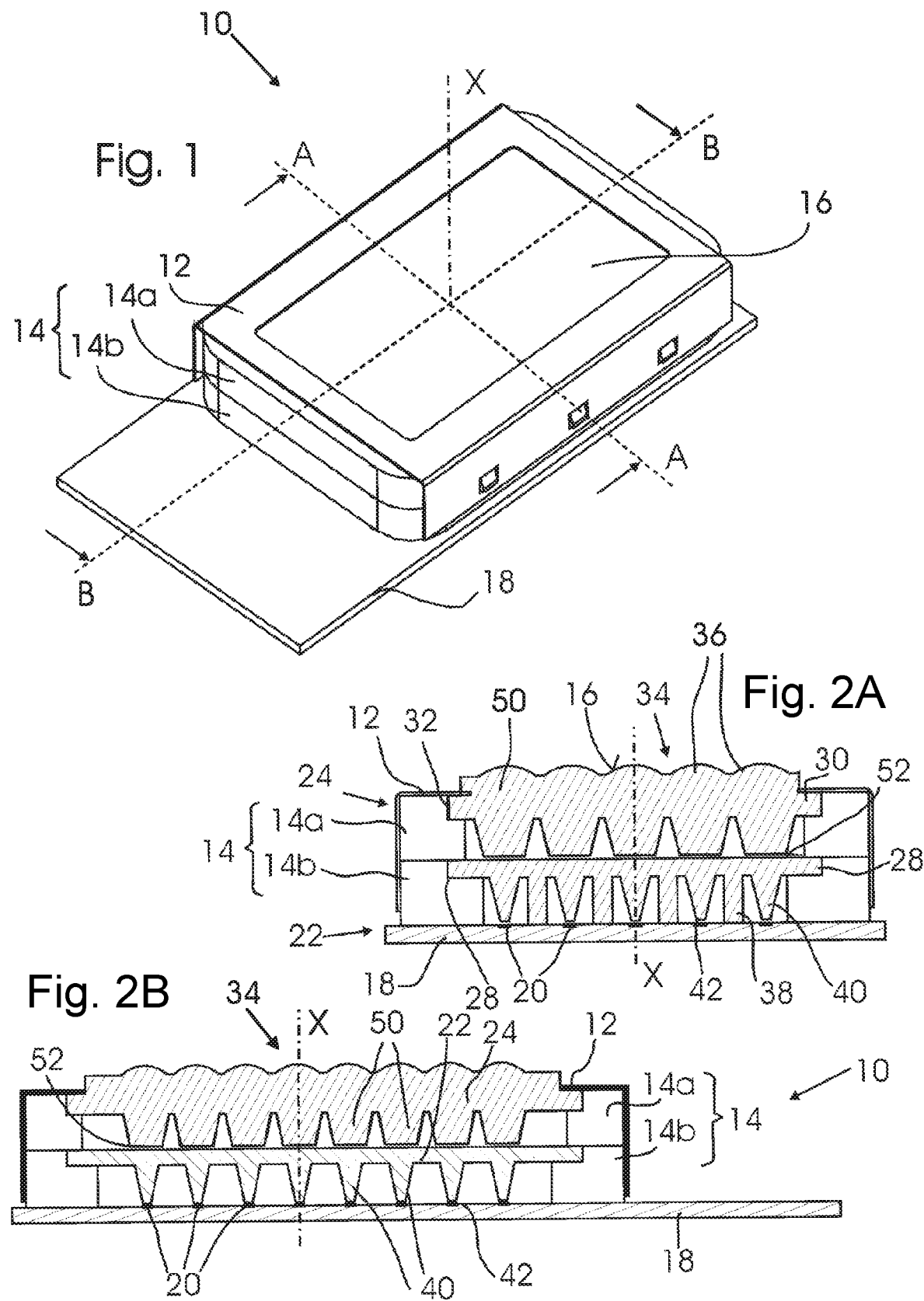

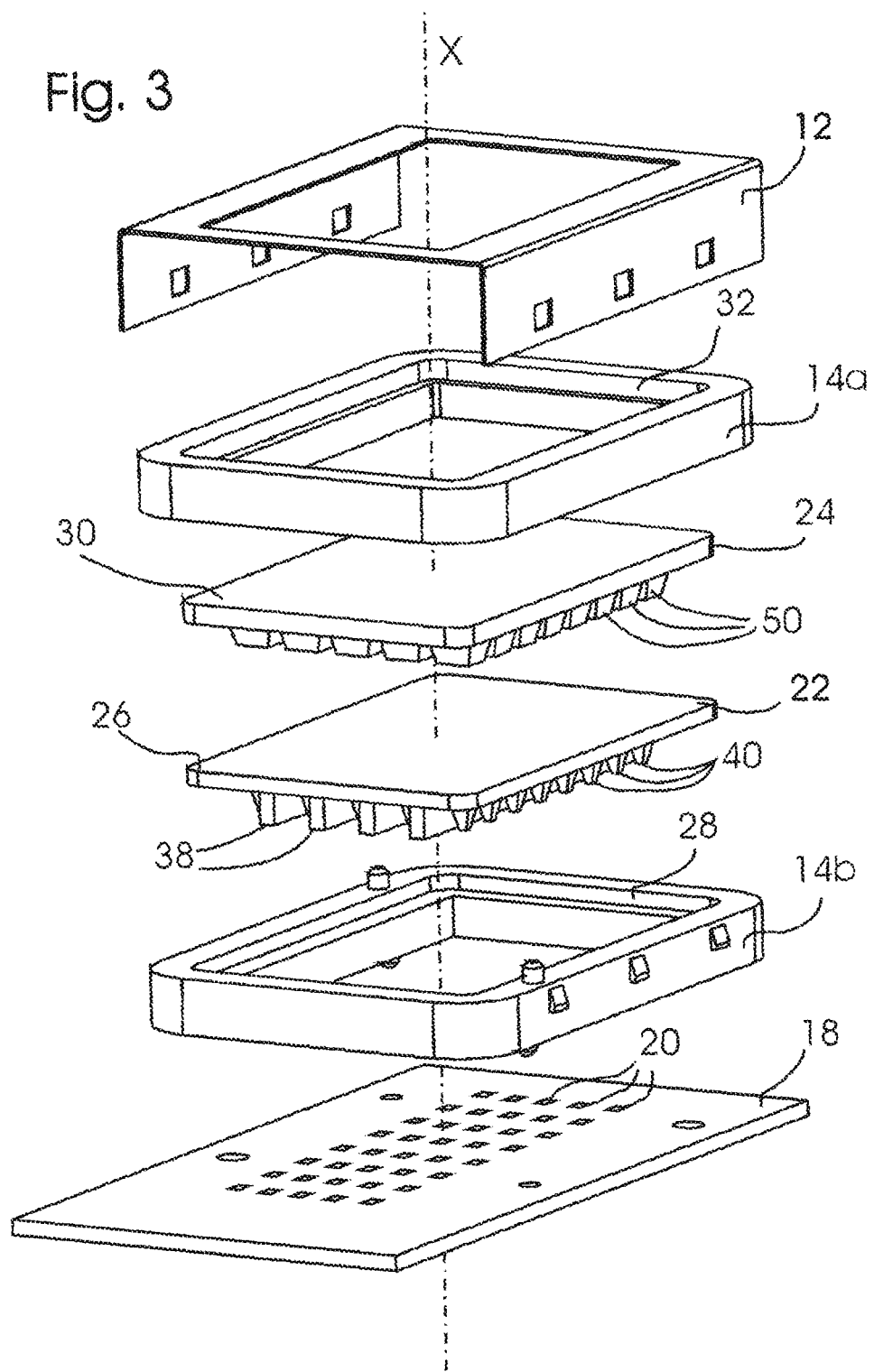

OPTICAL ARRANGEMENT WITH IMPROVED STABILITY

FIELD OF INVENTION

The invention relates to an optical arrangement including LED lighting elements and to a vehicle front lighting assembly.

BACKGROUND

Optical arrangements with LED lighting elements may be used in different lighting applications. In some known optical arrangements light emitted from individual LED lighting elements is shaped by optical elements to obtain an emitted light beam of desired properties. For multiple LED lighting elements, in particular if they are individually controllable, a plurality of individual optical elements may be provided for beam shaping.

WO 2018/065278 A1 describes a lighting arrangement with a plurality of LED lighting elements arranged on a support member. An optical element is arranged spaced from the LED lighting elements along an optical axis. The optical element is comprised of multiple TIR collimators arranged to receive light from the LED lighting elements and a lens portion to emit the light as a shaped illumination beam into the direction of the optical axis. A holder is provided to hold the optical element in a desired position. In an embodiment, the LED lighting elements form a matrix, which may be used in automotive front lighting, in particular for adaptive driving lighting.

It may be considered an object to provide an optical arrangement and a vehicle front lighting assembly that are easy to manufacture with high precision and have a stable construction.

This object may be addressed by an optical arrangement according to claim 1 and a vehicle front lighting assembly according to claim 14. Dependent claims relate to preferred embodiments.

The present inventors have considered the influence of the relative placement of LED lighting elements and optical elements arranged in front of them to form an emission beam. As preferred materials, such as silicone, have a high coefficient of thermal expansion, temperature changes may cause significant distortion. If the relative positioning of an optical element, such as a collimator, and an LED lighting element changes, in particular if the width of a gap between the LED lighting element and the optical element varies, the optical properties may be changed significantly. For example, the inventors have found that a change in distance between the top of the LED lighting element surface and a corresponding collimator light input surface by only 100 μm may lead a reduction of the luminous flux by 20% or more.

In considering how to form a stable arrangement, the present inventors have determined that support elements may be advantageously arranged in particular if a sufficient lateral distance remains between individual optical elements. However, such a lateral distance is not desired to form an emission beam. Therefore, the inventors propose an arrangement where a first collimator unit including a support element is arranged in front of the LED lighting element, and a second collimator unit is arranged in front of the first collimator unit.

In the optical arrangement according to the invention, LED lighting elements are arranged on a support surface. The support surface may preferably be a plane surface.

The term "LED lighting elements" is used here to refer to any type of solid state lighting element, including light emitting diodes, organic light emitting diodes (OLED), laser diodes, etc. The LED lighting elements may be packaged LEDs, but preferably are LED dies, which may be thermally and/or electrically contacted to the support surface, which may be e.g. a printed circuit board (PCB). The LED lighting elements preferably have a plane light emission surface acting as a Lambertian emitter.

In principle, the LED lighting elements may be provided on the support surface in any arrangement and configuration. Preferably, a light emission surface of the LED lighting elements may be arranged in parallel to the support surface. The LED lighting elements may be e.g. of rectangular shape, in particular of square shape. They are preferably arranged spaced from one another, in particular in regularly spaced arrangement, i.e. at equal distances. It is particularly preferred to arrange the LED lighting elements in a matrix configuration, i.e. in at least two rows and at least two columns.

An optical axis may be defined as extending from the support surface, preferably into the central direction of the light emitted from the LED lighting elements. Reference to the optical axis is used here to define the relative arrangement of LED lighting elements and further optical elements. In particular, an optical axis may extend perpendicularly from the LED lighting elements and/or from the support surface. As the skilled person will recognize, different optical axes may be defined for each of the LED lighting elements. These are preferably arranged at least substantially in parallel.

According to the invention, a first collimator unit is arranged in front of the LED lighting elements in the direction of the optical axis. The collimator unit includes first collimator elements. The terms "collimator" and "collimator element" are used here to designate optical elements which are disposed to reduce the opening angle of light emitted from a light output portion compared to light received at a light input portion. For example, a collimator may comprise reflective surfaces arranged to surround an optical axis and/or one or more lenses. Possible shapes and configurations of collimator elements according to various embodiments will be further discussed below.

The first collimator elements are arranged in front of the LED lighting elements to collimate light emitted therefrom. The term "in front of" should be understood as referring to the optical axis, i.e. indicating that light emitted from the LED lighting elements is received by the first collimator elements. In preferred embodiments the first collimator elements may comprise a plane light input portion arranged in parallel to a light emission surface of the corresponding LED lighting element. Preferably, a first collimator element is arranged in front of each LED lighting element such that light emitted from the LED lighting elements is emitted into the first collimator element preferably with no or minimal loss.

Further, the first collimator unit preferably includes at least one, preferably multiple support elements. The support elements are supported—directly or indirectly, i.e. there may be other elements interposed—on the support surface between at least two of the LED lighting elements.

Through this support, the first collimator unit with its first collimator elements may be maintained in a fixed position relative to the support surface, and thereby to the LED lighting elements. In particular, this allows for a constant position of the collimator elements relative to the respective LED lighting elements, e.g. at a small distance, even under the influence of temperature variations or external forces.

According to the invention, the optical arrangement further comprises at least a second collimator unit arranged in front of the first collimator unit in the direction of the optical axis. The second collimator unit comprises second collimator elements. Preferably, for each first collimator element of the first collimator unit the second collimator unit comprises a second collimator element being arranged in front of it.

Good optical properties may be obtained by collimating light emitted from the LED lighting elements both by a first and a second collimator element.

According to a preferred embodiment, at least two adjacent first collimator elements are arranged at a larger distance—in traverse direction relative to the optical axis—than two adjacent second collimator elements. As the collimator elements preferably have a width in traverse direction which increases along the optical axis, the distance referred to may be measured as the minimum distance, i.e. at the axial end of each collimator element farthest from the LED lighting element. In a particularly preferred embodiment a distance between two adjacent second collimator elements is less than 50% of the distance between two adjacent second collimator elements, preferably less than 30%.

According to a preferred embodiment, the first collimator unit may comprise a connecting portion arranged spaced from the support surface, preferably in parallel thereto. The connecting portion may be a plane portion. The first collimator elements and the support element may be connected by the connecting portion to provide a mechanical connection. In a particularly preferred embodiment, the connecting portion, the first collimator elements and the support element(s) may be formed in one piece. The connecting portion preferably has a height corresponding to less than 50%, further preferably 30% or less of the height of the first collimator unit (height being measured in the direction of the optical axis). By reducing the height of the connecting portion, optical cross-talk between the LED lighting elements and first and second collimator elements is reduced. For example, the height of the connecting portion may be limited to 4 mm or less, particularly preferred 3 mm or less.

In preferred embodiments, the first collimator unit includes a plurality of support elements supported on the support surface between the LED lighting elements. The support elements may have any thickness and shape suited to provide stable support of the first collimator unit on the support surface, i.e. to carry forces acting in the direction of the optical axis. For example, the support elements may be shaped as individual pillars, e.g. in a shape of a conical frustum, a pyramid frustum, a cylinder with circular, rectangular or other cross-section, or any other shape. In one embodiment, the support element(s) may be of elongate shape. For example, the support element(s) may be shaped as a wall separating first collimator elements on both sides. A support element of elongate shape may extend e.g. in traverse direction to the optical axis and/or in parallel to the support surface, for example for a length corresponding to at least one distance between neighboring LED lighting elements, preferably two or more of such distances. Preferably, the support element(s) may have a width corresponding to at least 10% of a distance between the LED lighting elements between which it is supported on the support surface, further preferred at least 20% thereof.

In a preferred embodiment, the first collimator elements may be arranged spaced from the LED lighting elements such that a gap remains. The gap may e.g. be 1000 μm or less, but preferably is smaller, such as below 400 μm, preferably below 200 μm, further preferably 100 μm or below. Maintaining such small distances is in particular facilitated by support elements.

The first and/or the second collimator elements may be solid transparent bodies, which may act as TIR (total internal reflection) collimators. It is particularly preferred to form the first and/or second collimator elements as solid bodies of an at least partly transparent material, such as e.g. silicone. The collimator elements preferably have a shape where the width (measured traverse to the optical axis) increases from a light input portion disposed on the optical axis facing the LED lighting elements to a light output portion disposed on the opposite side thereof. Pyramidal or conical frustums are preferred shapes. In alternative embodiments, the first and/or second collimator elements may also be lenses focusing incident light closer towards the optical axis, thus reducing the opening angle.

In preferred embodiments, the support elements and the first collimator elements of the first collimator unit may be formed in one piece. Also, the second collimator elements of the second collimator unit may be formed in one piece. However, it may be preferred to provide the second collimator elements to be made from a material different from a material of the first collimator elements. While the first collimator elements are arranged close to the LED lighting element and therefore require high heat stability, the second collimator elements are arranged spaced therefrom and have less heat load. Therefore, the material of the second collimator elements may have a lower heat stability than the material of the first collimator elements.

The height of the first and/or second collimator elements, measured in the direction of the optical axis, may differ for different embodiments. Preferably, the height of the second collimator elements may be from 50% to 200% of the height of the first collimator elements. Further preferred, the height of the second collimator elements may be 60%-140% of the height of the first collimator elements, particularly preferred the first and second collimator elements have at least substantially the same height.

The first and second collimator units may be arranged directly on top of each other in the direction of the optical axis. In a preferred embodiment, a gap may be provided between the first and second collimator units. The gap, which preferably is present at a basic temperature of 20° C., may close at higher temperatures due to thermal expansion, such that the first and second collimator units are then arranged in direct contact.

The optical arrangement described above may in particular be used in a vehicle front lighting assembly. A front lighting beam may be emitted into the direction of the optical axis. Further optical elements, such as one or more projection lenses may be provided. If the LED lighting elements are individually controllable, the beam characteristics may be chosen by corresponding control of the LED lighting elements.

These and other aspects of the invention will be apparent from and elucidated with reference to the embodiments described hereinafter.

BRIEF DESCRIPTION OF THE DRAWING(S)

FIG. 1 shows a perspective view of an optical arrangement according to a first embodiment of the invention;

FIG. 2A shows a sectional view along line A . . . A in FIG. 1;

FIG. 2B shows a sectional view along line B . . . B in FIG. 1;

FIG. 3 shows a perspective exploded view of the optical arrangement of FIGS. 1, 2A, 2B;

Figure 6A:
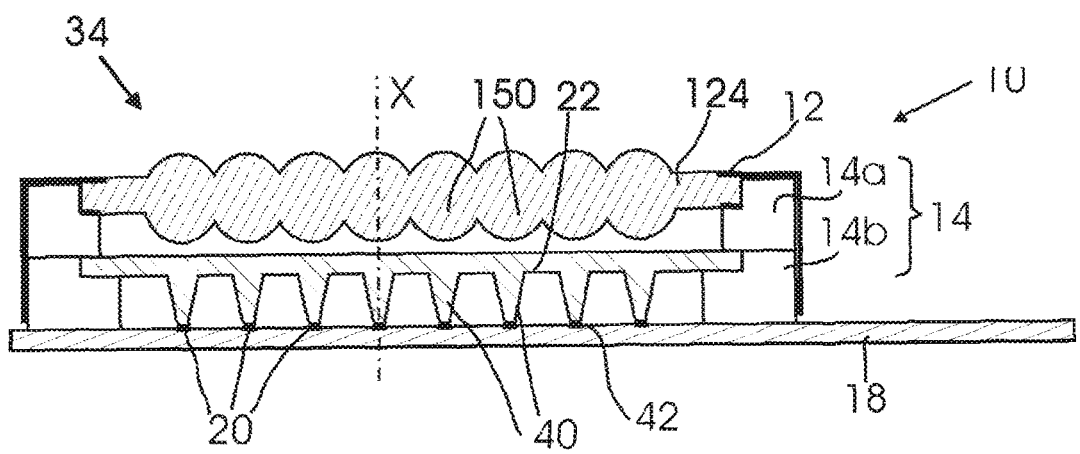
Figure 6B:
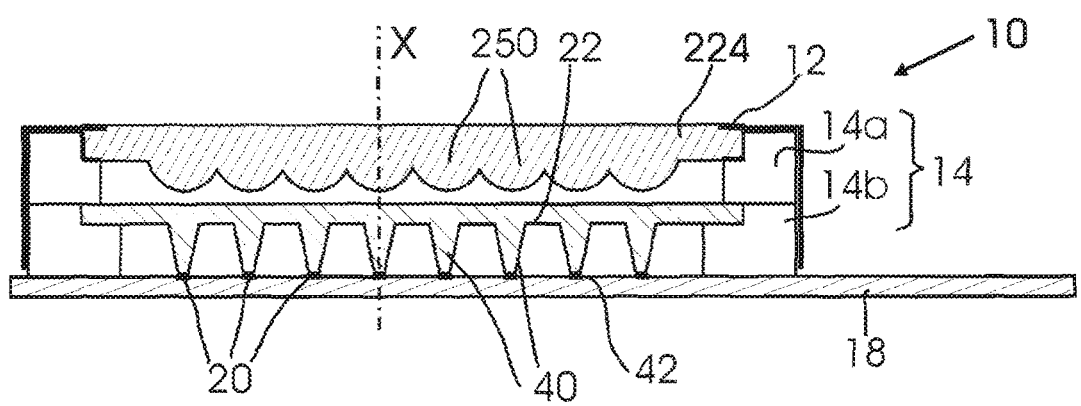
Figure 6C:
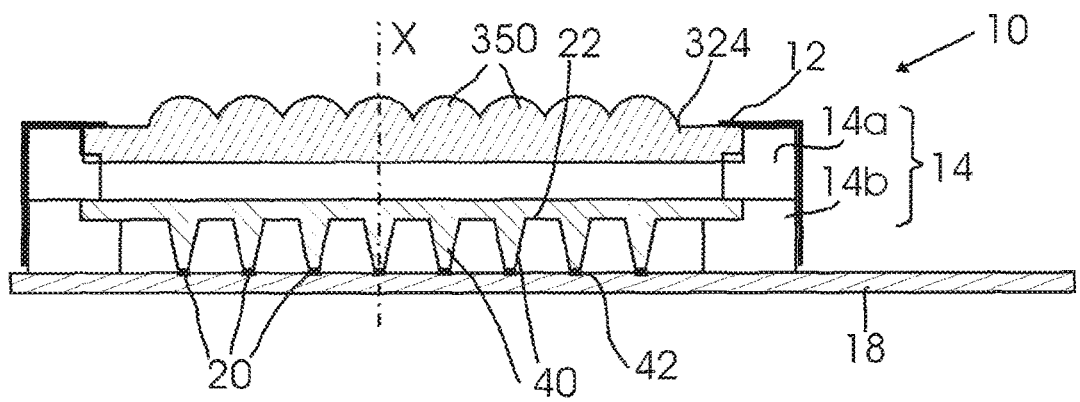
Figure 7:
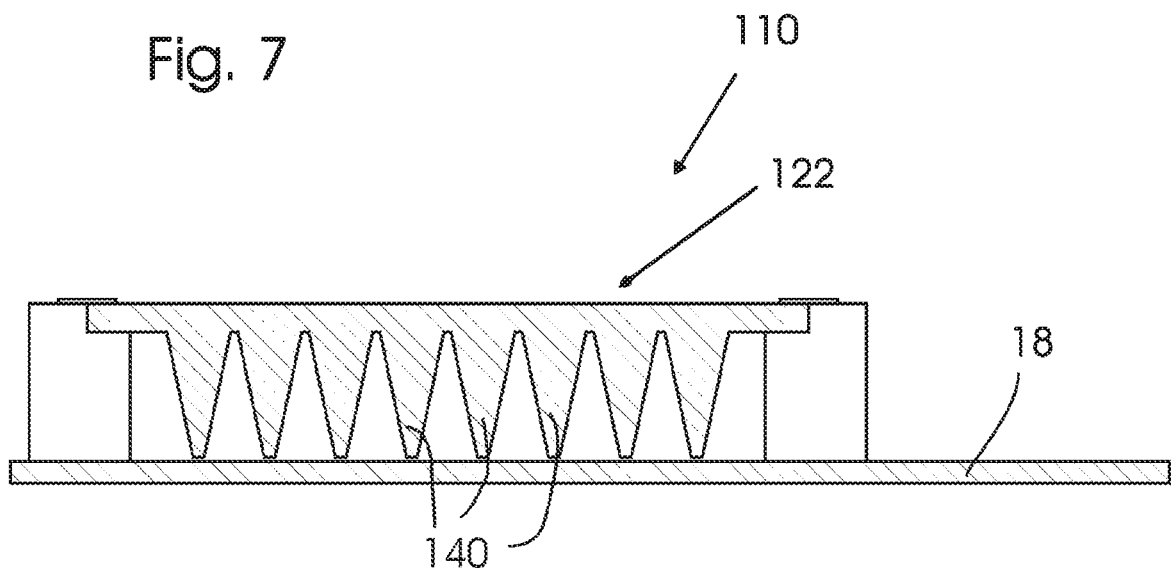

FIGS. 6A, 6B, and 6C show sectional views of alternative embodiments;

FIG. 7 shows a sectional view of a comparative example of an optical arrangement;

DETAILED DESCRIPTION OF THE PREFERRED EMBODIMENT(S)

As shown in FIG. 1, an optical arrangement 10 according to a first embodiment comprises a frame 12 and a holder 14 comprised of an upper holder portion 14a and a lower holder portion 14b mounted on a support surface of a printed circuit board PCB 18. On top of the optical arrangement 10 a plane beam emission surface 16 is provided bordered by the frame 12. An optical axis X extends in a light emission direction perpendicular to the beam emission surface 16.

As shown in particular in FIG. 3, LEDs 20 are arranged on the PCB 18 in a matrix configuration, which in the example shown comprises 5×8 LEDs equally spaced in rows and columns. Each LED is of square shape and has a plane light emission surface facing in the direction of the optical axis X. The LEDs are individually operable, i.e. may be turned on and off independently of one another.

A first collimator unit 22 and a second collimator unit 24 are arranged in front of the LEDs 20 in the direction of the optical axis X. The first and second collimator units 22, 24 are each solid bodies of transparent material formed in one piece.

The first collimator unit 22 has a plate-shaped connecting portion 26. The lower holder portion 14b is mounted by form-fitting elements to the PCB 18 and is arranged to hold and support the first collimator unit 22 by receiving the edges of the connecting portion 26 in a groove 28.

The second collimator unit 24 also has a plate-shaped connecting portion 30. The upper holder 14a is mounted on the lower holder 14b by form-fitting elements and is arranged to hold and support the second collimator unit 24 by edges of the connecting portion 30 resting in a groove 32.

The frame 12 is a metal frame covering the holder 14 while leaving the beam emission surface 16 free. The frame 12 is mounted to the holder 14 by form-fitting elements.

Figure 4:
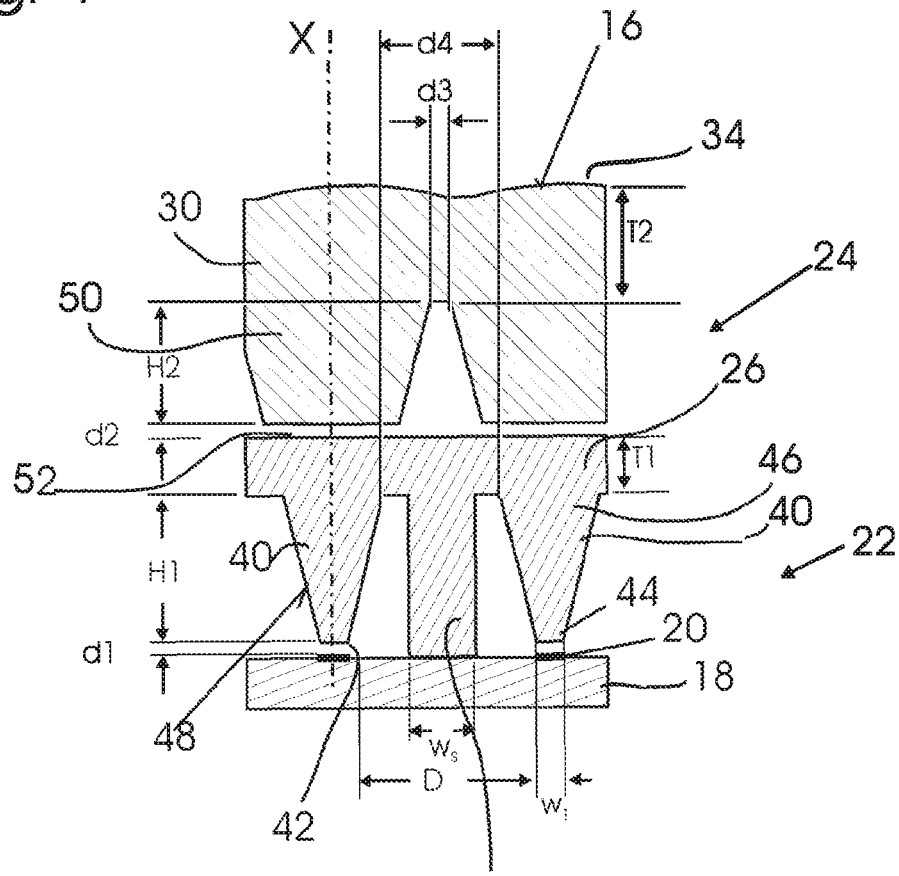
FIG. 4 shows an enlarged portion of the sectional view of FIG. 2A.

The arrangement of the first and second collimator units 22, 24 according to the first embodiment is shown in the sectional views of FIGS. 2A, 2B and 4. As shown, the beam emission surface 16 is not entirely plane, but comprises a lens arrangement 34 with a plurality of individual lenses 36 connected together, which is not shown in FIGS. 1 and 3.

The first collimator unit 22 comprises support elements 38 and first collimator elements 40 extending from the connecting portion 26. The support elements 38 are slightly longer than the first collimator elements 40, such that the support elements 38 rest on the support surface 18, whereas a gap 42 remains between the LEDs 20 and the first collimator elements 40.

The first collimator elements 40 as shown in FIG. 4 each have a light input portion 44, which is a plane surface, and a light output portion 46, which is the plane surface at which the first collimator elements 40 are connected to the connecting portion 26. The first collimator elements 40 are shaped such that their width in traverse direction, i.e. perpendicular to the optical axis X, increases along the optical axis X with increasing distance from the LEDs 20, such that the light output portion 46 has a larger traverse extension than the light input portion 44.

The first collimator elements 40 are of pyramid frustum shape with side surfaces 48 surrounding the optical axis X. As visible in particular from FIG. 5, the light input portion 44 and the light output portion 46 are of square shape. The width $w_2$ of the light output portion 46 is about three times the width $w_1$ of the light input portion 44.

The collimator elements 40, which are made of a transparent material, preferably Silicone, are TIR (total internal reflection) collimators. Their side surfaces 48 reflect light received at the light input portion 44 and guided within the collimator element 40 such that the opening angle of the light emitted at the light output portion 46 is less than the opening angle of the light emitted from the LEDs 20 entering the first collimator elements 40 at the light input portion 44.

The relative arrangement of the light input portions 44 of the first collimator elements 40 in front of the LEDs 20 is kept stable by the support elements 38. The surface of the light input portions 44 has the same shape and width W1 as the LEDs 20 and is arranged in parallel thereto separated by the small air gap 42 of less than 100 μm.

Figure 5:
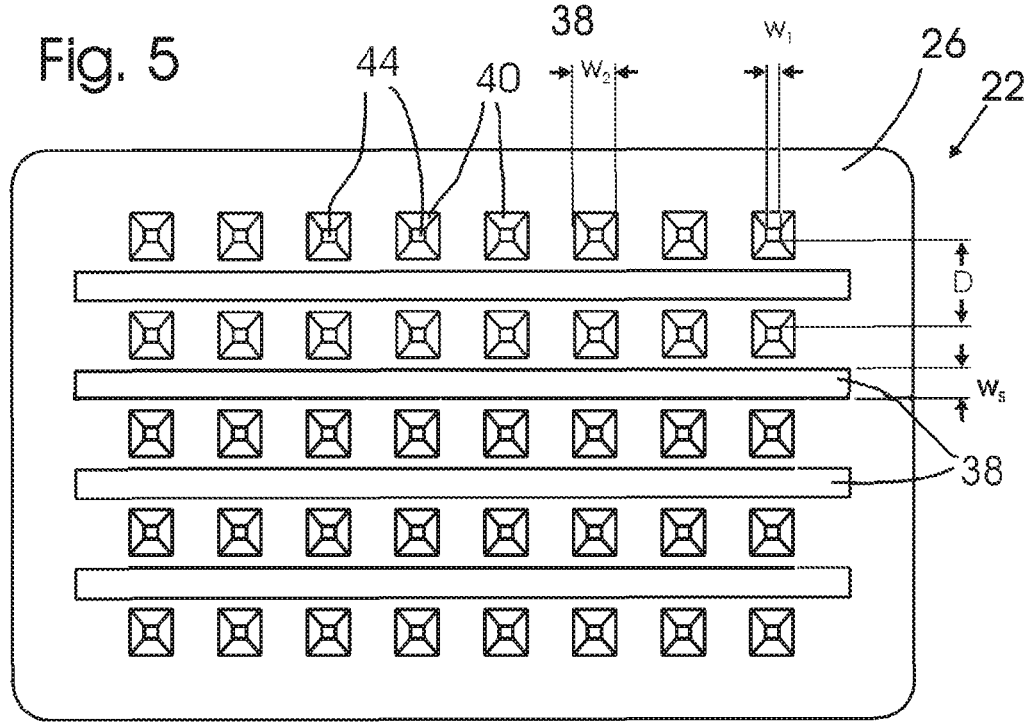
FIG. 5 shows a bottom view of a first collimator unit of the lighting arrangement according to FIGS. 1-4.

As visible in particular from FIG. 5, the support elements 38 are shaped as rectangular, elongate cuboids extending between rows of first collimator elements 40. The LEDs 20 are arranged at a distance D on the PCB 18. The support elements 38 have a width $w_S$ of about one third of the distance D.

The second collimator elements 50 are also of a shape widening with increasing distance from the LEDs 20, in particular of a pyramid frustum shape and act as TIR reflectors. They are arranged separated from the connecting portion of the first collimator unit by an air gap 52.

For each LED 20 one first collimator element 40 and one second collimator element 50 is provided, arranged along the optical axis X. Thus, the optical arrangement 10 comprises multiple individual optical arrangements of LEDs 20, collimator elements 40, 50, and lens elements 36 to generate, form and collimate, and project individual beams of light, in the example arranged in a 5×8 matrix.

Due to the small gap 42, light emitted from the LEDs 20 is coupled into the first collimator elements 40 at their light input portions 44 with high efficiency, i.e. minimal loss of luminous flux. The light propagates within the first collimator elements 40 and light portions of a high opening angle are collimated by reflection at the side surfaces 48. Light from the first collimator elements 40 enters the connecting portion 26 at the light output portion 46 and is again emitted at the top of the connecting portion 26. Across the gap 52 emitted light is coupled into the second collimator elements 50 and propagates therein up to the connecting portion 30 to be emitted at the beam emission surface 16. The resulting beam is projected by the lens arrangement 34.

A height H1 of the first collimator elements 40 and a height H2 of the second collimator elements 50 differ slightly; in the example shown H2 is about 80% of H1. A thickness T1 of the connecting portion 26 of the first collimator unit 22 is slightly smaller than a thickness T2 of the connecting portion 30 of the second collimator unit 24. The thickness T1, T2 of the connecting portions 26, 30 is small compared to the height H1, H2 of the first and second collimator elements 40, 50 to reduce optical cross-talk, i.e. propagation of light in traverse direction within the connecting portions 26, 30.

A (minimum) distance d4 between two adjacent first collimator elements 40 separated by the support elements 38 is significantly larger than a (minimum) distance d3 between two adjacent second collimator elements 50. This leaves sufficient space for the arrangement of the support element 38 in between the adjacent first collimator elements 40 while avoiding large gaps between second collimator elements 50, so that the beam emission surface 16 may be entirely or almost entirely illuminated.

As a result, the beam of light emitted at the beam emission surface (and projected by the lens arrangement 34) consists of a matrix of collimated individual beams which may be individually turned on or off by corresponding operation of the LEDs 20. The projected beam may e.g. be used as a front illumination beam of a motor vehicle. By selectively turning portions of the beam on or off, selective driving beam functions may be implemented.

While such a matrix beam may in principle also be achieved by the optical arrangement 110 according to the comparative example shown in FIG. 7, which only comprises a single collimator unit 122 with individual collimator elements 140, the optical arrangement 10 provides improved stability both with regard to external forces and temperature changes. In the optical arrangement 110 according to the comparative example, an exact gap between the collimator units 122 and the LEDs 20 on the PCB 18 may be difficult to maintain, in particular if heat generated in operation causes the material of the collimator unit 122 to expand. In the optical arrangement 10 the position of the first collimator elements 40 is kept stable by the support elements 38 and connection thereto through the connecting portion 26 even for significant temperature changes.

While the first collimator unit 22 has a high heat load caused by the operation of the LEDs 20 and therefore is preferably made of silicone as a transparent material of high temperature stability, the second collimator unit 24, being separated from the heat generated by the LEDs 20, will have a lower heat load and may therefore be made of a material of less temperature stability, for example PMMA (polymethyl methacrylate), PC (polycarbonate), PP (polypropylene), borosilicate glass, PS (polystyrene), or glass.

If the first and/or second collimator units 22, 24 expand under the influence of increased temperature, the gap 52 between them may close such that they are in direct contact.

FIGS. 6A, 6B, and 6C show examples of alternative embodiments. The alternative embodiments correspond in most details to the above described first embodiment. Like parts are designated by like reference numerals. In the following, only differences will be further discussed.

In the alternative embodiments of FIGS. 6A, 6B, and 6C, second collimator units 124, 224, 324 with second collimator elements 150, 250, 350 of different shape are provided. The second collimator elements 150, 250, 350 are shaped as lenses of different shape. The lenses 150, 250, 350 further collimate the light received from the first collimator unit 22.

While the invention has thus been illustrated and described in detail in the drawings and the foregoing description, such illustration and description are to be considered illustrative or exemplary and not restrictive; the invention is not limited to the disclosed embodiments.

For example, the number and relative arrangement of the LEDs 20 as well as the described shapes and dimensions of the first and second collimator units 22, 24 and collimator elements 40, 50 may be chosen differently. For example, while a small gap 42 is preferred, the light input portions 44 of the first collimator elements 40 may be arranged at a larger distance to the LEDs 20, which provides a safety factor for large tolerances at the cost of lower efficiency.

In alternative embodiments, the first and/or second collimator elements need not necessarily be TIR reflectors, but each collimator element may alternatively be a lens or an arrangements of multiple lenses.

Further variations to the disclosed embodiments can be understood and effected by those skilled in the art in practicing the claimed invention, from a study of the drawings, the disclosure and the dependent claims. In the claims, the word "comprising" does not exclude other elements and steps, and the indefinite article ("a" or "an") does not exclude a plurality. The mere fact that certain measures are recited in mutually different dependent claims or different embodiments does not indicate that a combination of these measures cannot be used to advantage. Any reference signs in the claims should not be construed as limiting the scope.

What is claimed is:

1. A light emitting diode (LED) lighting system comprising:
   an array of rows and columns of LED elements on a support surface of a substrate;
   a first collimator unit comprising an array of rows and columns of first collimator elements and at least one support element, the first collimator unit adjacent the LED lighting elements with the first collimator elements opposite the LED lighting elements and one of the at least one support element extending between at least two rows of the LED lighting elements and in contact with the support surface of the substrate;
   a frame-shaped holder having a single opening, mounted to the support surface and engaged with a periphery of the first collimator unit with all of the first collimator elements and the at least one support element protruding through the single opening; and
   a second collimator unit comprising second collimator elements, the second collimator unit adjacent the first collimator unit with the second collimator elements opposite the first collimator elements.

2. The system according to claim 1, wherein at least two adjacent first collimator elements are spaced apart at a first distance and at least two adjacent second collimator elements are spaced apart at a second distance, and the first distance is larger than the second distance.

3. The system according to claim 1, wherein the first collimator unit comprises a connecting portion, and the first collimator elements and the at least one support element are connected to the connecting portion.

4. The system according to claim 3, wherein the first collimator elements and the at least one support element protrude from the connecting portion.

5. The system according to claim 1, wherein the holder is engaged with both the first collimator unit and the second collimator unit.

6. The system according to claim 1, wherein the at least one support element comprises a plurality of support elements, and the first collimator unit is adjacent the LED lighting elements with each of the plurality of support elements between two adjacent LED lighting elements.

7. The system according to claim 1, wherein the first collimator elements are spaced apart from the LED lighting elements.

8. The system according to claim 1, wherein the second collimator unit is a single member comprising the second collimator elements and a connecting portion.

9. The system according to claim 8, wherein the second collimator elements protrude from the connecting portion.

10. The system according to claim 1, wherein the second collimator elements are made from a different material than the first collimator elements.

11. The system according to claim 1, wherein at least one of the first collimator elements and the second collimator elements are solid transparent bodies shaped as one of pyramidal and conical frustums.

12. The system according to claim 1, wherein a height of each of the second collimator elements is 50% to 200% of a height of each of the first collimator elements.

13. The system according to claim 1, wherein a width of the at least one support element is at least 10% of a distance between the at least two of the LED lighting elements.

14. The system according to claim 1, wherein the first collimator unit and the second collimator unit are separated by a gap.

15. The system according to claim 1, wherein the first collimator unit and the second collimator unit are spaced apart from the LED elements along an optical axis, with the first collimator unit between the LED elements and the second collimator unit.

16. The system according to claim 1, wherein the holder comprises an upper holding portion and a lower holding portion, the upper holding portion being mounted to the lower holding portion, and the lower holding portion being mounted to the support surface.

17. The system according to claim 16, wherein:
the first collimator unit comprises a first connecting portion with the first collimator elements and the at least one support element protruding from the first connecting portion,
the second collimator unit comprises a second connecting portion with the second collimator elements protruding from the second connecting portion,
the upper holding portion comprises a receiving portion that engages with edges of the second connecting portion of the second collimator unit, and
the lower holding portion comprises a receiving portion that engages with edges of the first connecting portion of the first collimator unit.

18. A vehicle front lighting system comprising:
an array of rows and columns of LED elements on a support surface of a substrate;
a first collimator unit comprising an array of rows and columns of first collimator elements and at least one support element, the first collimator unit adjacent the LED lighting elements with the first collimator elements opposite the LED lighting elements and one of the at least one support element extending between at least two rows of the LED lighting elements and in contact with the support surface of the substrate;
a frame-shaped holder having a single opening, mounted to the support surface and engaged with a periphery of the first collimator unit with all of the first collimator elements and the at least one support element protruding through the single opening; and
a second collimator unit comprising second collimator elements, the second collimator unit adjacent the first collimator unit with the second collimator elements opposite the first collimator elements.

19. The system of claim 18, further comprising one or more projection lenses adjacent the second collimator unit.

* * * * *